United States Patent [19]

Rodengen

[11] Patent Number: 4,468,860
[45] Date of Patent: Sep. 4, 1984

[54] MEASURING DEVICE

[76] Inventor: Jeffrey L. Rodengen, 2560 Iris Way, Laguna Beach, Calif. 92651

[21] Appl. No.: 356,111

[22] Filed: Mar. 8, 1982

[51] Int. Cl.³ .......................... G01B 3/16; G01B 7/02
[52] U.S. Cl. ............................... 33/148 H; 33/149 J
[58] Field of Search ............ 33/148 E, 148 H, 148 R, 33/149 R, 149 J, 152 R, 152 C, 1 PT, 143 L, 147 N; 377/24, 17; 364/560, 561, 562, 563, 564

[56] References Cited

U.S. PATENT DOCUMENTS

| 593,608 | 11/1897 | Rosenkranz | 33/465 X |
| 729,717 | 6/1903 | Beasley | 33/152 C |
| 2,886,892 | 5/1959 | Banfill | 33/148 H |
| 2,910,777 | 11/1959 | Sessions | 33/148 H |
| 4,195,348 | 3/1980 | Kakutani | 33/140 X |
| 4,216,584 | 8/1980 | Meissner et al. | 33/143 L |

FOREIGN PATENT DOCUMENTS 19782  7/1899  Switzerland ...................... 33/27 B Primary Examiner—Harry N. Haroian
Attorney, Agent, or Firm—Harvey C. Nienow

[57] ABSTRACT

A measuring device having a pair of pivotally moveable styli connected together by means of a potentiometer, for varying electrical resistance in accordance with the angular disposition between the styli. The measuring device further comprises a source of power in circuit with the potentiometer and a plurality of scale options comprising manual actuators for changing the electrical parameters in circuit with the potentiometer and a visual display device.

2 Claims, 11 Drawing Figures

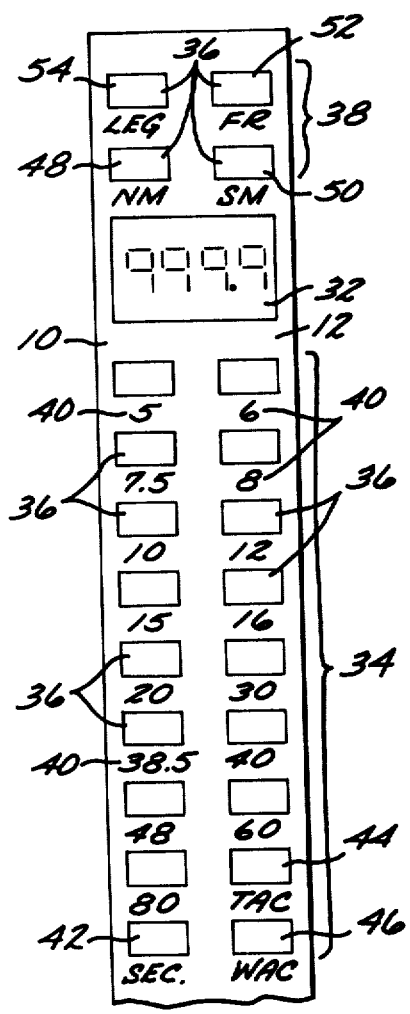
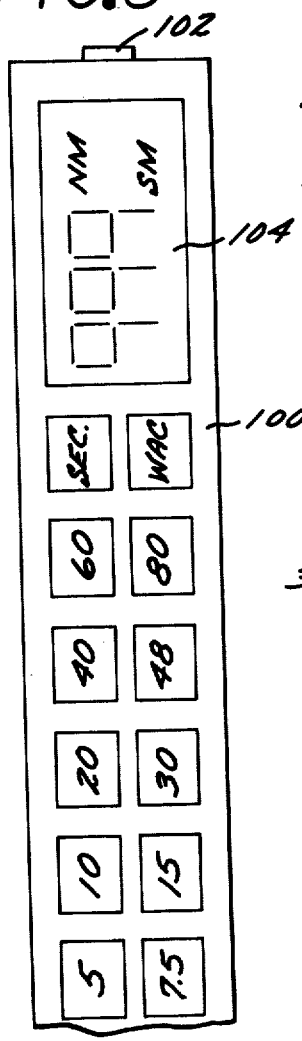
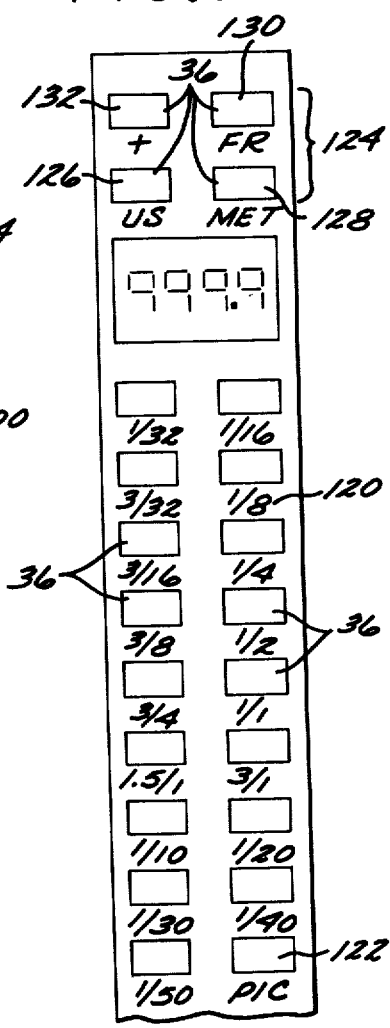
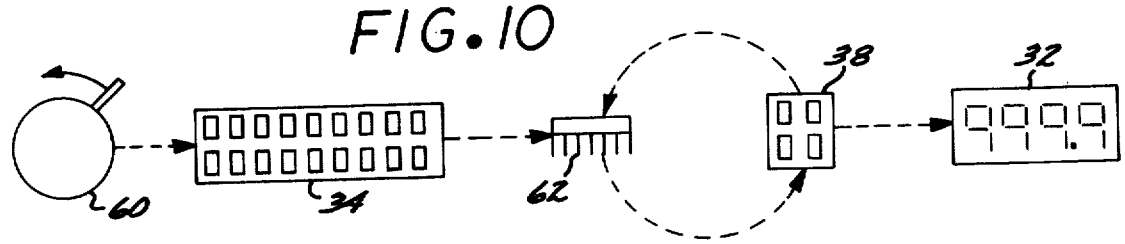
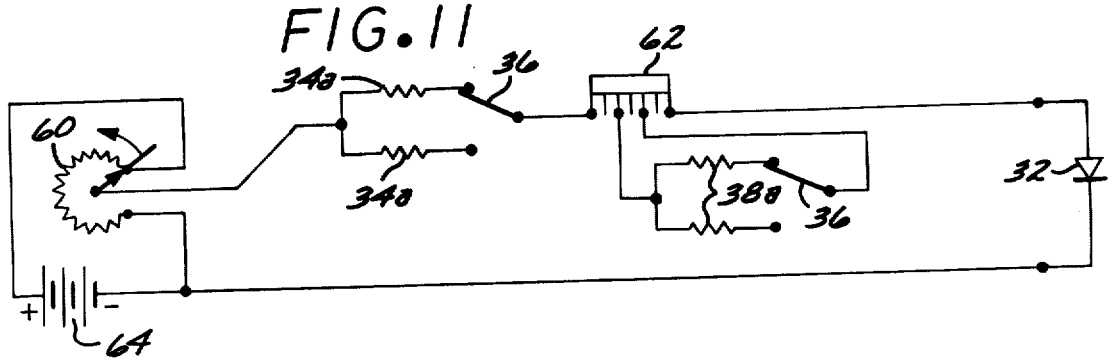

MEASURING DEVICE

The present invention relates generally to measuring means, but more particularly to measuring devices for reading distances or dimensions on a map, chart or drawing.

In order to convey the relative location of places or things, maps, charts and drawings have been available for a considerable period of time. Very often, such maps, charts and drawings have been drawn very accurately to a given scale to enable one to determine the precise distance between the places and objects. This is true with respect to navigational maps and charts which show the location of cities, railroad tracks, airports and the like, as well as with respect to architectural and engineering drawings which show the relative position of walls, machinery, surfaces of an object, and the like.

Frequently, it is necessary to be able to measure the actual map, chart or drawing to determine the distance between objects or locations. In so doing, it is necessary to use the scale which was originally used in making the map, chart or drawing. This is particularly necessary in navigating aircraft, for which there are many different types and kinds of maps and charts which are drawn to various different scales. For instance, in navigating an airplane or the like, frequently it is necessary to locate on the map or chart one's present position or location as well as one's destination, and to physically measure the distance therebetween on the map. By applying the map scale to such measurement, the actual mileage to the destination is thereby obtained.

In order to accomplish the foregoing with prior art technology, it is necessary to have a measuring device or scale for the particular map or chart scale. Not only are such scales extremely cumbersome and difficult to use in an aircraft, but it is necessary to have available a great many different scales in the event it becomes necessary to thereafter use a different map having a different scale.

It is an object of the present invention to provide a measuring device which is useable with substantially any one of a multiplicity of different maps, charts or drawings having different scales.

A further object of the present invention is to provide a measuring device as characterized above wherein selection means is provided for enabling any one of a plurality of such scales to be selected as desired.

A still further object of the present invention is to provide a measuring device as characterized above which is easy to use under minimum light conditions.

An even still further object of the present invention is to provide a measuring device as characterized above which is provided with an illuminated display which enables one to readily see the distance measurements.

Another still further object of the present invention is to provide a measuring device as characterized above which can be used with one hand so as to enable the map, chart or drawing to be held stationary with another hand.

An additional object of the present invention is to provide a measuring device as characterized above which utilizes electronic components which are accurate and reliable, and wherein its own source of power is provided.

Another still further object of the present invention is to provide a measuring device as characterized above which is simple and inexpensive to manufacture and which is rugged and dependable in operation.

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

FIG. 7 is a fragmentary front view of the device of FIG. 1;

FIG. 8 is a fragmentary front view of a second embodiment of the present invention;

FIG. 9 is a fragmentary front view of a third embodiment of the present invention;

FIG. 10 is a block diagram of the electronic components of a measuring device according to the present invention; and FIG. 11 is a schematic drawing of a portion of the components and circuitry for a measuring device according to this invention.

Like reference characters indicate corresponding parts throughout the several views of the drawings.

Figure 1:
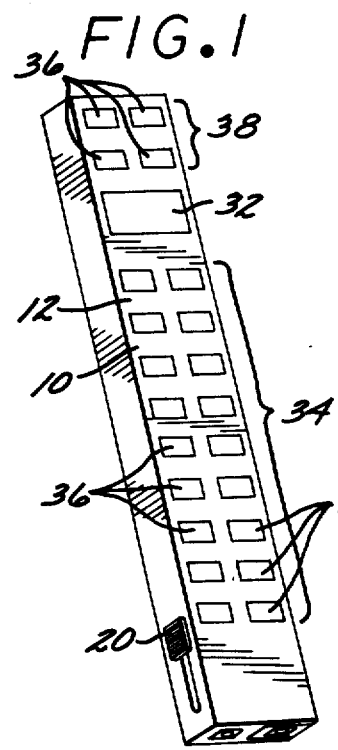
FIG. 1 is a perspective view of a measuring device according to the present invention.

Referring to FIG. 1 of the drawings, there is shown therein a measuring device 10 according to the present invention. As shown more particularly in FIG. 2 of the drawings, device 10 comprises a main body 12 and an arm 14 which is pivotally mounted to main body 12 near end portions 14a and 12a, respectively. It is contemplated that main body 12 and arm 14 may be made of any appropriate material such as wood, metal, plastic or the like, depending upon the elegance or inexpensiveness desired. Main body 12 is formed with an elongated recess or cutout 12b for receiving arm 14 in its retracted or stored position, as shown most particularly in FIGS. 1 and 3 of the drawings.

Figure 2:
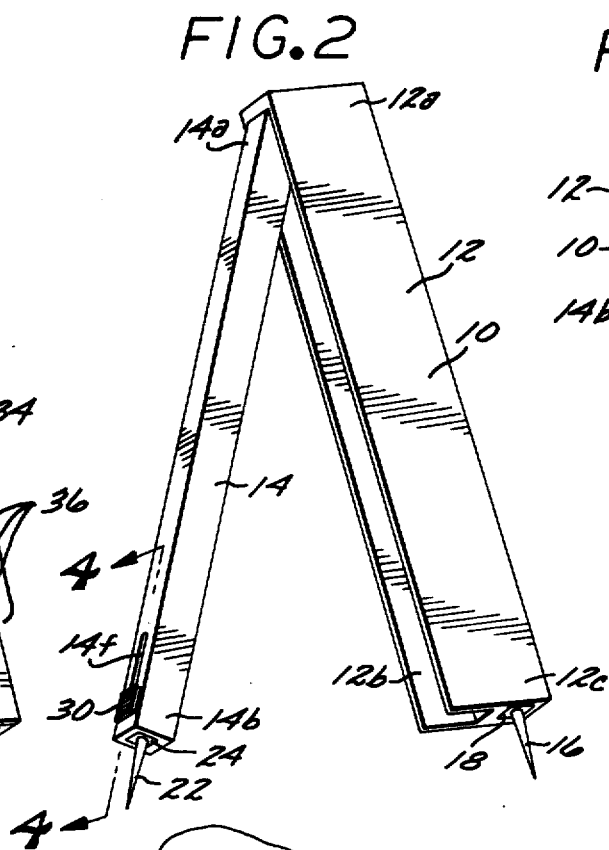
FIG. 2 is a perspective view of the device of FIG. 1 shown in operating position.
Figure 3:
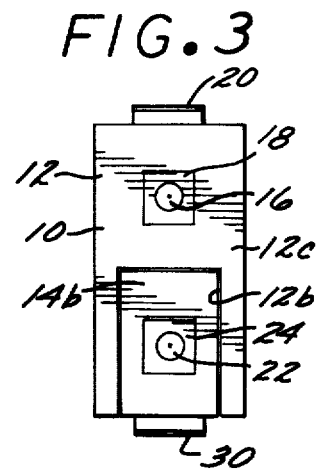
FIG. 3 is an end view of the device of FIG. 1.

Mounted within main body 12 is a first stylus 16 which, in its operating position, extends beyond the end 12c of main body 12, as shown in FIG. 2 of the drawings. Stylus 16 is secured to a guide member 18 which is manually moveable between retracted and extended positions by means of member 20. However, it is contemplated that electrical switch means (not shown) might be associated with guide member 18 such that extending stylus 16 to its operating position would close such switch and thereby complete the operating electrical circuitry for the device 10, and movement in the opposite direction would render such circuitry inoperative. Other than that, the mechanism for controlling the position of stylus 16 is identical to that with respect to the means for controlling the position of a second stylus 22 in the end portion 14b of arm 14.

Figure 4:
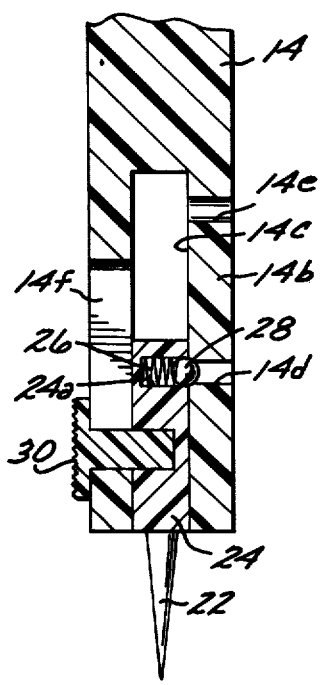
FIG. 4 is a fragmentary sectional view taken substantially along line 4—4 of FIG. 2 of the drawings.

As shown most particularly in FIG. 4 of the drawings, end portion 14b of arm 14 is formed with an elongated cutout 14c wherein a guide member 24 is slidably mounted and which carries the stylus 22. Such guide member is formed with a lateral recess 24a wherein a compression spring 26 is mounted for urging a locking ball 28 into cooperation with either of openings 14d and 14e in arm 14. A finger-operated slide member 30 is secured to guide member 24 as shown in FIG. 4, and is operable within an elongated slot 14f in arm 14, as also shown in FIGS. 1 and 2.

Figure 6:
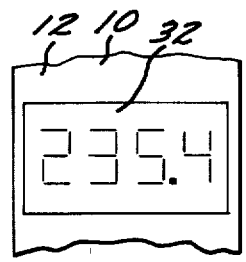
FIG. 6 is a fragmentary view of area 6 in FIG. 5 of the drawings.

As shown in FIGS. 1 and 6 of the drawings, there is mounted in main body 12 a display device 32 which is an extremely low current electronic device for displaying numbers as readouts. Such display device is connected in circuit with a source of portable electric power as well as various other circuit components which are housed within the hollow interior of main body 12, as will hereinafter become more apparent.

In addition to the display device 32 within main body 12, there is a bank 34 of scale option devices comprising a plurality of manually operable push-button switches 36 which are used to select the particular scale desired for taking measurement from a particular map, chart or drawing.

Also mounted within main body 12 is a bank 38 of functional push-button switches 36 which together with the appropriate electrical circuitry provide certain functions with respect to the information obtained from the measuring portion of the device.

As will be readily apparent to those persons skilled in the art, the particular type of measuring device herein is adaptable to any desired map, chart or drawing scale, and substantially any desired function to be performed with the measurements or readout information. Such adaptability and selectivity are well provided within the state of the art in the electronic industry where electronic chips and modules of substantially any configuration and design are readily available.

For instance, one possible arrangement of scale options and functions is shown in FIG. 7 of the drawings, which is based on the device shown in FIG. 1. Therein, the bank 34 of scale options is shown with indicia 40 associated with each of the various push-button switches 36 expressly for navigation of aircraft. As indicated previously herein, there is a wide variety of maps, drawings and charts pertaining to flight navigation. Most of the scales on such maps and charts are contemplated within the scale options 34 shown in FIG. 7. Except for button 42, the left-hand bank of push buttons pertains to IFR navigation charts as presently provided by Jeppesen Sanderson. The same is true of the push buttons in the right-hand bank except for push buttons 44 and 46. The numerals adjacent the push buttons for IFR navigation represent the number of miles which are equivalent to one inch on the particular IFR chart or map.

Push button 42 which is associated with the indicia SEC pertains to the scale normally found on sectional charts, and the push button 44 associated with the indicia TAC identifies the scale normally found on terminal area charts. In like fashion, push button 46 is associated with the scale normally found on world aeronautical charts. All of push buttons 42, 44 and 46 pertain to navigation according to VFR which is the visual flight rules.

Thus, the bank 34 of scale options pertains to substantially all of the possible charts or map scales which might be encountered by a navigator of aircraft.

The functional bank 38 of push buttons or switches 36 may take on substantially any desired functions in handling the readouts or displays which appear at the display device 32. Several functions contemplated in the embodiment shown in FIG. 7 are nautical miles for push button 48 and statute miles for push button 50. Thus, the navigator can select to have the distance measurements displayed on device 32 in either of these units. In order to enable the device 10 to be used for measuring longer distances on a given map, chart or drawing, there are provided several additional push button switches 52 and 54. When it is desired to accumulate successive readings of distance, it is merely necessary, while a first reading is being taken by device 10, to depress push button 52 to cause the reading in the device 32 to be stored or "frozen". Thereafter, when an additional leg or component of a total measurement is provided on the display device 32, it is merely necessary to depress push button 54 to cause such additional reading to be added to the stored reading or information so as to display on device 32 the accumulation or total of those several readings. As will be readily understood by those persons skilled in the art, such accumulation of readings can be continued throughout an entire measurement across a given chart or map, or even across several charts or maps having similar or different scales.

As above indicated, mounted within main body 12 are the various circuit components which are readily available from the electronics industry, and which operate to cause the above-described functions. Referring to FIG. 10 of the drawings, there is shown therein, in generally block diagram form, various of the components which make up some of the circuitry.

A potentiometer 60 is mounted at the pivotal connection between arm 14 and main body 12 to provide a means for determining the angular disposition therebetween. The information from such potentiometer is applied to the bank 34 of scale options, to be acted upon by the components of the pre-selected scale, and from there the resulting signal is sent to a logic chip or circuit 62. This circuit cooperates with the function bank 38 to cause the reading from the potentiometer 60 to be handled in the prescribed manner as above explained with respect to the embodiment shown in FIG. 7. The resulting electronic data or information is then displayed at device 32, providing a reading of the actual mileage distance between locations on the chart or map being read.

FIG. 11 of the drawings shows the block diagram of FIG. 10 as specific circuit components. In FIG. 11 the potentiometer 60 is shown connected in circuit with a source of electric power 64 which may take the form of small batteries mounted within main body 12. Thus, with the various legs of the potentiometer 60 connected individually to the arm 14 and main body 12 of device 10, the electrical potential provided as the output of the potentiometer is proportional to the angular disposition of the several styli 16 and 22.

Such output from potentiometer 60 is fed through the scale option bank 34 which may take the form of means for providing more or less electrical resistance in the circuit as shown by resistors 34a and push-button switches 36.

The logic circuit 62 is shown connected in circuit with various resistors 38a and push-button switches 36 which are part of the functional bank 38 shown in FIG. 7. The display device 32 is shown in circuit with the various other components, including the battery 64 so that the reading or display at device 32 is governed by the scale option selection and function selection as above described.

Figure 5:
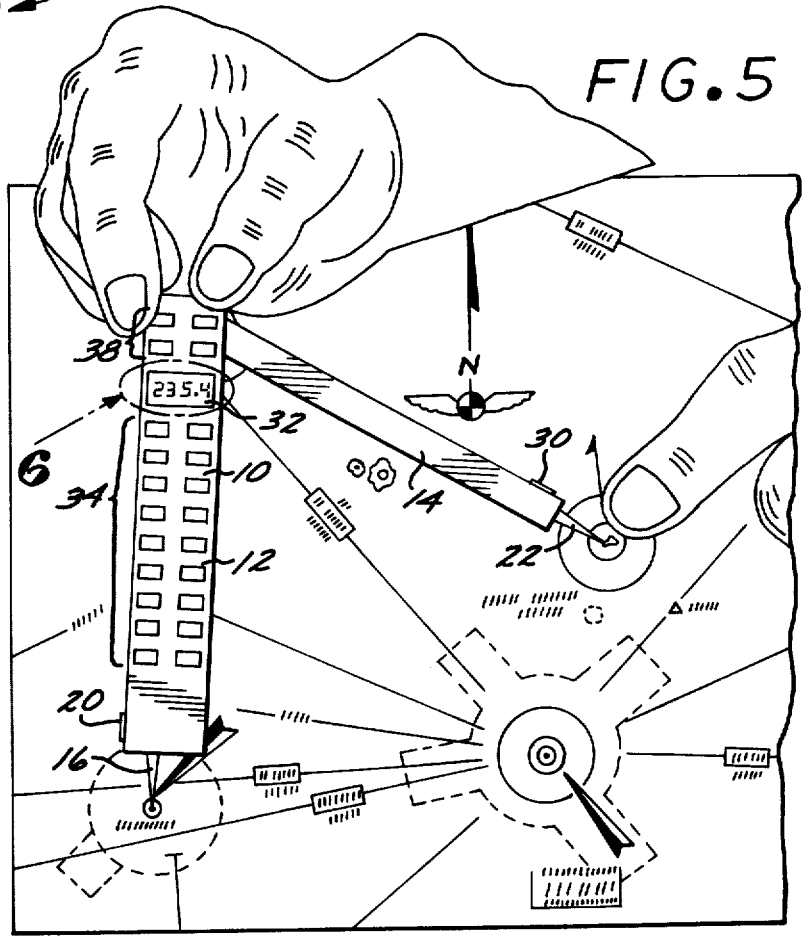
FIG. 5 is a fragmentary plan view showing the device of FIG. 1 in use.

As shown in FIG. 5 of the drawings, the device shown in FIG. 1 is used by locating the respective styli 16 and 22 on the various map or chart locations as shown. The angular disposition of the leg 14 and body 12, at that time, defines the output of potentiometer 60 as above explained. The readout at device 32 thus provides a direct reading of statute miles or nautical miles, in accordance with the previous selection. As will be readily understood, particular scale selection has been previously made in accordance with the scale of the chart or map to provide an accurate mileage indication.

Referring to FIGS. 8 and 9 of the drawings, there is shown therein, embodiments two and three of the present invention. Embodiment two of FIG. 8 is particularized to the Jepperson Sanderson charts previously mentioned, as well as to the sectional and world aeronautical charts. Such second embodiment 100 is a simplified form of the above-described first embodiment and has only two functional selections, namely statute miles and nautical miles as determined by a two-position switch having a manual actuator 102. Thus, if a navigator of aircraft utilizes almost exclusively these particular charts or maps, this simplified embodiment is most appropriate. As will be readily understood by those persons skilled in the art, the manual actuator 102 is connected to a light indicator in the display device 104 to indicate which of the mileage selections has been made.

Embodiment three shown in FIG. 9 pertains to an engineering measuring device 120 wherein the various scales provided by push buttons 36 are scales which are normally used on architectural or engineering drawings. Also included in such scale options is push button 122 which enables printers and publishers to use measuring device 120 since this button provides a pica scale of measurement. Embodiment 120 of FIG. 9 further contemplates functional bank 124 having manual push buttons 36 which, at push buttons 126 and 128, provide a selection between the U.S. Customary (U.S.) and metric (MET) measurements, respectively, and push buttons 130 and 132 which enable measurements to be frozen or stored and then accumulated, respectively.

It is thus seen that the present invention provides a measuring device which provides a direct reading of distance from one point to another on a map, chart or drawing, in accordance with the scale with which the map, chart or drawing was originally made. Although I have shown and described certain specific embodiments of my invention, I am well aware that many modifications thereof are possible. The invention itself, therefore, is not to be restricted except insofar as is necessitated by the prior art and by the spirit of the appended claims.

I claim:

1. A measuring device comprising in combination,
   a main body having a first stylus fixed relative thereto,
   an arm pivotally mounted on said main body and carrying a second stylus,
   a source of electric power in said main body,
   a potentiometer in said main body connected to said source of power and operatively interposed between said first and second styli to measure the angular relative position therebetween,
   means including an electroresponsive display device on said main body in circuit with said source and operable to provide a display on said main body corresponding to the angular disposition of said styli as an indication of the lineal distance between said styli,
   means on said main body for selectively altering the scale for the lineal distance between said styli, including a plurality of different electrical resistors and manually operable push button switches individually in circuit wherewith for connection in circuit with said potentiometer as desired for selectively altering the electric parameters in circuit with said source and said display device,
   said main body being formed with an elongated recess for receiving said arm and second stylus when said measuring device is in its stored condition and said second stylus is retracted,
   and retractable mounting means for each of said styli comprising a spring-bias locking member which cooperates with a dent to effectively lock the respective stylus in operating position in said main body and arm respectively.

2. A measuring device according to claim 1 wherein means is included for storing and accumulating successive displays on said electroresponsive display device, said storing and accumulating means including a manual actuator in circuit with said electroresponsive device to store information in a given display, and an additional manually-operated push button switch in circuit with said display device for operation to add succeeding display information to the stored information and to cause display of the total thereof by said electroresponsive display device.

* * * * *